(12) United States Patent
Wei et al.

(10) Patent No.: US 11,645,817 B2
(45) Date of Patent: May 9, 2023

(54) INFORMATION PROCESSING METHOD AND APPARATUS, TERMINAL DEVICE, AND COMPUTER READABLE STORAGE MEDIUM ON DISPLAYING DECOUPLED VIRTUAL OBJECTS IN A VIRTUAL SCENE

(71) Applicant: TENCENT TECHNOLOGY (SHENZHEN) COMPANY LIMITED, Shenzhen (CN)

(72) Inventors: Jia Wei, Shenzhen (CN); Ying Sha, Shenzhen (CN); Zhechuan Zhang, Shenzhen (CN); Hong Zhang, Shenzhen (CN); Chuankang Fan, Shenzhen (CN); Xiao Pan, Shenzhen (CN); Xiaowei Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 192 days.

(21) Appl. No.: 16/773,496

(22) Filed: Jan. 27, 2020

(65) Prior Publication Data
US 2020/0160610 A1  May 21, 2020

Related U.S. Application Data

(63) Continuation of application No. PCT/CN2018/096852, filed on Jul. 24, 2018.

(30) Foreign Application Priority Data

Jul. 28, 2017  (CN) .......................... 201710629157.4

(51) Int. Cl.
G06T 19/00    (2011.01)
G06F 3/01     (2006.01)
(Continued)

(52) U.S. Cl.
CPC ............ *G06T 19/006* (2013.01); *G06F 3/011* (2013.01); *G06F 3/017* (2013.01); *G06F 3/0346* (2013.01); *G06F 3/0425* (2013.01)

(58) Field of Classification Search
None
See application file for complete search history.

(56) References Cited

U.S. PATENT DOCUMENTS

2006/0170652 A1*  8/2006  Bannai .................... G06F 3/011
                                                                345/156
2008/0220876 A1   9/2008  Mehta et al.
(Continued)

FOREIGN PATENT DOCUMENTS

CN    103460255 A    12/2013
CN    104536763 A    4/2015
(Continued)

OTHER PUBLICATIONS

Structure Studio, "Moving and Rotating Objects", posed Jan. 2013, https://www.structurestudios.com/help/editing-the-objects (Year: 2013).*
(Continued)

*Primary Examiner* — Sarah Le
(74) *Attorney, Agent, or Firm* — Anova Law Group, PLLC

(57) ABSTRACT

An information processing method is provided for a terminal device. The method includes obtaining an image including an AR target; recognizing the AR target, and generating a virtual scene including N virtual objects (N being an integer greater than or equal to 2); disassembling the virtual scene to obtain the N virtual objects; and generating object information that separately corresponds to the N virtual objects, which include a target virtual object to be interacted with by a user. The method also includes keeping the object information of virtual objects other than the target virtual object in the N virtual objects unchanged and updating the object
(Continued)

information of the target virtual object in response to receiving an operation instruction inputted by the user for the target virtual object, such that the target virtual object is interacted independently rather than the virtual scene as whole by the user.

12 Claims, 6 Drawing Sheets

(51) Int. Cl.
*G06F 3/0346* (2013.01)
*G06F 3/042* (2006.01)

(56) References Cited

U.S. PATENT DOCUMENTS

| | | | |
|---|---|---|---|
| 2010/0027888 A1* | 2/2010 | Katano | G06T 19/006 382/173 |
| 2012/0079426 A1 | 3/2012 | Jin et al. | |
| 2012/0157203 A1* | 6/2012 | Latta | G06F 3/0485 463/32 |
| 2012/0249416 A1 | 10/2012 | Maciocci et al. | |
| 2013/0190094 A1* | 7/2013 | Ronen | A63F 13/79 463/42 |
| 2013/0218542 A1* | 8/2013 | Yerli | G06T 13/20 703/6 |
| 2013/0257908 A1* | 10/2013 | Ota | G06T 19/006 345/633 |
| 2015/0363974 A1* | 12/2015 | Nakai | G06V 20/20 345/88 |
| 2016/0357491 A1 | 12/2016 | Oya | |
| 2017/0270713 A1* | 9/2017 | Dooley | G06F 3/011 |

FOREIGN PATENT DOCUMENTS

| | | |
|---|---|---|
| CN | 105843396 A | 8/2016 |
| CN | 106445156 A | 2/2017 |
| CN | 106851426 A | 6/2017 |
| CN | 107390875 A | 11/2017 |
| JP | 2006262965 A * | 10/2006 |
| JP | 2012068984 A | 4/2012 |
| JP | 2016224810 A | 12/2016 |
| JP | 2017016202 A | 1/2017 |
| WO | 2011109126 A1 | 9/2011 |

OTHER PUBLICATIONS

Minecraft, "Pi Edition", Feb. 2013, https://minecraft.fandom.eom/wiki/Pi_Edition#Release (Year: 2013).*

Minecraft, "Pi Edition", Feb. 2013, https://minecraft.fandom.com/wiki/Glass_Pane (Year: 2013).*

Nadia Oxford, "Smash Hit Walkthrough", posted Mar. 31, 2014, https://www.gamezebo.com/walkthroughs/smash-hit-walkthrough/ (Year: 2014).*

The World Intellectual Property Organization (WIPO) International Search Report for PCT/CN2018/096852 Oct. 24, 2018 5 Pages (including translation).

The State Intellectual Property Office of the People's Republic of China (SIPO) Office Action 1 for 201710629157.4 Jul. 23, 2019 8 Pages (including translation).

The Japan Patent Office (JPO) Notification of Reasons for Refusal for Application No. 2020-503322 and Translation Jan. 12, 2021 5 Pages.

* cited by examiner

INFORMATION PROCESSING METHOD AND APPARATUS, TERMINAL DEVICE, AND COMPUTER READABLE STORAGE MEDIUM ON DISPLAYING DECOUPLED VIRTUAL OBJECTS IN A VIRTUAL SCENE

RELATED APPLICATIONS

This application is a continuation application of PCT Patent Application No. PCT/CN2018/096852, filed on Jul. 24, 2018, which claims priority to Chinese Patent Application No. 2017106291574, entitled "INFORMATION PROCESSING METHOD AND APPARATUS, TERMINAL DEVICE, AND COMPUTER READABLE STORAGE MEDIUM" filed with the China National Intellectual Property Administration on Jul. 28, 2017, content of all of which is incorporated by reference in its entirety.

FIELD OF THE TECHNOLOGY

The present disclosure relates to the field of augmented reality (AR) and, more specifically, to an information processing method and apparatus, a terminal device, and a computer-readable storage medium.

BACKGROUND

An AR technology is a technology for calculating a position and an angle of an image in a camera in real time and adding virtual information such as an image, a video or a 3D model to the image. A system using the AR technology may be referred to as an AR system. For example, a terminal device is a common AR system. An objective of the AR system is to overlay a virtual world onto the real world for display both on a screen to enhance the sensory experience of the real world for a user of the AR system.

AR systems may be applied to the medical field, military field, industrial maintenance field, game field, among others. Using the application of an AR system to the game field as an example, a conventional AR system may acquire or scan an AR target in the real world by using a camera and create a virtual scene used for a game around the AR target after recognizing the AR target. However, the entire virtual scene generally changes as the spatial location of the AR target in the camera changes. A user can control the virtual scene by using a virtual key (or a virtual joystick), so that the user is provided with the sensory experience of playing the game in the real world.

The disclosed methods and systems are directed to solve one or more problems set forth above and other problems.

SUMMARY

The present disclosure provides an information processing method and apparatus, a terminal device, and a computer-readable storage medium, to improve the interactivity of an AR system.

According to an aspect of the present disclosure, an information processing method is provided for a terminal device. The method includes obtaining an image that includes an augmented reality (AR) target and is acquired by the terminal device; recognizing the AR target, and generating a virtual scene including N virtual objects (N being an integer greater than or equal to 2); disassembling the virtual scene to obtain the N virtual objects, and generating object information that separately corresponds to the N virtual objects. The N virtual objects include a target virtual object to be interacted with by a user. The method also includes keeping the object information of virtual objects other than the target virtual object in the N virtual objects unchanged and updating the object information of the target virtual object in response to receiving an operation instruction inputted by the user for the target virtual object in the N virtual objects, such that the target virtual object is interacted independently rather than the virtual scene as whole by the user.

According to another aspect of the present disclosure, a terminal device is provided. The terminal device includes a camera for obtaining an image comprising an augmented reality (AR) target; and a processor connected to the camera. The processor is configured to perform: obtaining from the camera the image that comprises the AR target; recognizing the AR target, and generating a virtual scene, the virtual scene comprising N virtual objects, and N being an integer greater than or equal to 2; disassembling the virtual scene to obtain the N virtual objects, and generating object information that separately corresponds to the N virtual objects, wherein the N virtual objects include a target virtual object to be interacted with by a user; and keeping the object information of virtual objects other than a target virtual object in the N virtual objects unchanged and updating the object information of the target virtual object in response to receiving an operation instruction inputted by the user for the target virtual object in the N virtual objects, such that the target virtual object is interacted independently rather than the virtual scene as whole by the user.

According to another aspect, a non-transitory computer-readable storage medium is provided. The non-transitory computer-readable storage medium stores computer program instructions executable by at least one processor to perform: obtaining an image that includes an augmented reality (AR) target and is acquired by the terminal device; recognizing the AR target, and generating a virtual scene, the virtual scene including N virtual objects, and N being an integer greater than or equal to 2; disassembling the virtual scene to obtain the N virtual objects, and generating object information that separately corresponds to the N virtual objects, wherein the N virtual objects include a target virtual object to be interacted with by a user; and keeping the object information of virtual objects other than the target virtual object in the N virtual objects unchanged and updating the object information of the target virtual object in response to receiving an operation instruction inputted by the user for the target virtual object in the N virtual objects, such that the target virtual object is interacted independently rather than the virtual scene as whole by the user.

Other aspects of the present disclosure can be understood by those skilled in the art in light of the description, the claims, and the drawings of the present disclosure.

DETAILED DESCRIPTION

The present disclosure provides a terminal device. The type of the terminal device is not specifically limited in the present disclosure. In some embodiments, the terminal device may be a terminal device having a network access and/or call function. For example, the terminal device may be a mobile phone, a tablet computer, a head-mounted display (HMD), a notebook computer, an ultra-mobile personal computer (UMPC), a netbook, a personal digital assistant (PDA) or the like.

An AR target mentioned in the present disclosure may be one or more target objects in the real world, and the one or more target objects can be recognized by the terminal device. For example, the AR target may be an image on one or more pieces of printing paper in the real world. For another example, the AR target may be a building in the real world. For still another example, the AR target may be a material or texture in the real world. After being recognized by the terminal device, the AR target may be used for triggering the creation of a virtual scene.

For example, after recognizing the AR target, the terminal device may use a spatial location of the AR target as a reference object, and sets a virtual scene around the AR target based on a pre-established spatial location relationship between the AR target and the virtual scene. The virtual scene may include various virtual information (for example, a virtual object, an image or a video). An AR system applied to the game field is used as an example. After the terminal device recognizes an AR target, a game program in the terminal device may establish a virtual game scene based on the AR target. The game scene may include at least one virtual object, and a user may interact with the virtual object in the game scene, thereby providing the user with the sensory experience of playing a game in the real world.

The game program may be generated by a game engine. The game engine may be core components of some editable written-computer game systems or some interactive real-time image application programs. The game engine may provide various tools required by a game designer to write a game. An objective of the game engine is to enable the game designer to readily develop a game program instead of starting from scratch.

Figure 1:
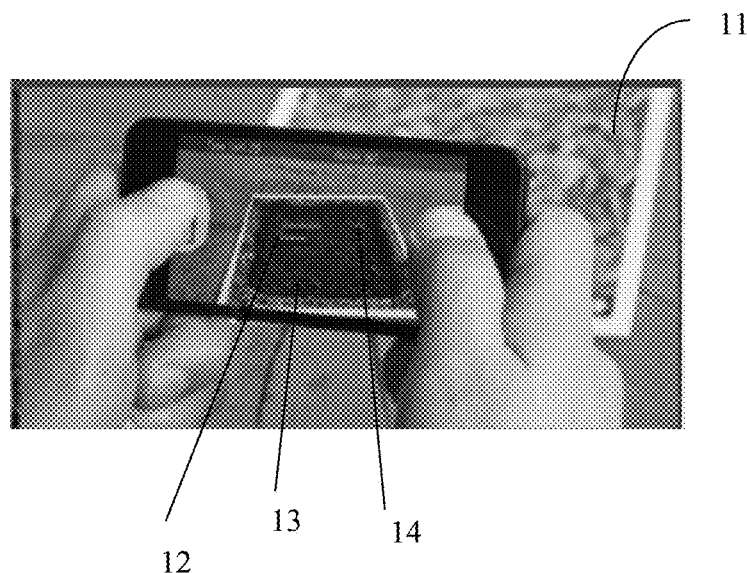
FIG. 1 illustrates a conventional AR game system.

Using a game called "Snake" based on an AR technology, as shown in FIG. 1, an AR target in the real world may be a lawn pattern 11 printed on printing paper. A user may acquire or scan the printing paper by using a camera (not shown in the figure) of the terminal device, to recognize the lawn pattern 11. For the game Snake, the lawn pattern 11 is set as the boundary of a moving area for a snake. Therefore, after the lawn pattern 11 is recognized and a spatial location of the lawn pattern 11 is determined, a spatial location of a virtual scene is determined based on the lawn pattern 11. The virtual scene (including a snake 12, soil 13, an apple 14, and the like in FIG. 1) is then generated for the user to play the game in the virtual scene.

Figure 2:
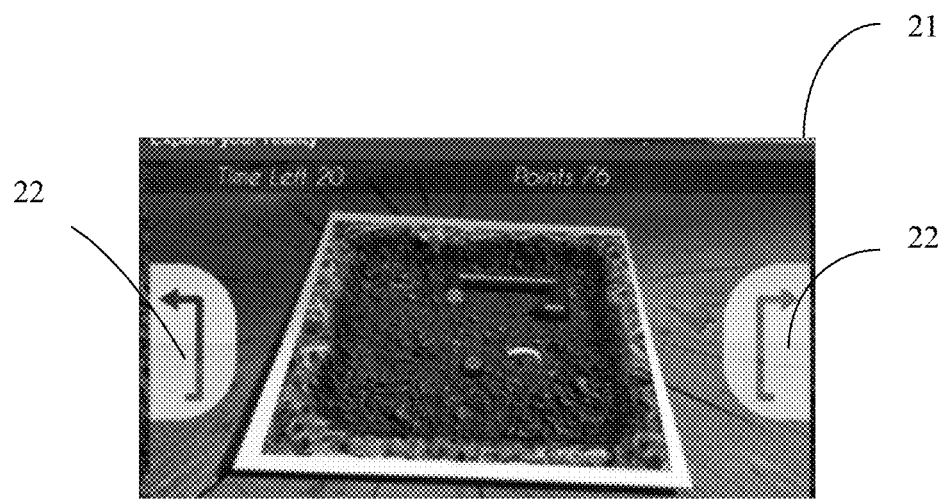
FIG. 2 illustrates displayed content on a display screen of the game system in FIG. 1.

For a conventional AR system, after an AR target is recognized and a virtual scene is generated, a user cannot directly interact with a virtual object in the virtual scene, but needs to use a particular medium (for example, a physical or virtual key or a joystick) to indirectly interact with the virtual object in the virtual scene. FIG. 2 shows a virtual game scene of the game Snake.

As shown in FIG. 2 that, after entering the game scene, the user mainly uses virtual keys 22 located on two sides of a display screen 21 to control the moving direction of a snake. In fact, in the conventional AR system, even if the user touches a virtual object in a scene on a display screen, the virtual object gives no effective feedback, because an entire virtual scene is modeled as a whole. Most objects in the virtual scene are merely displayed. The user needs to use a particular interface provided by the AR system such as a virtual key or a virtual joystick on the display screen to interact with a virtual object in the virtual scene. Therefore, the interactivity of the conventional AR system needs to be improved.

The following describes certain embodiments of the present disclosure in detail with reference to specific accompanying drawings.

Figure 3:
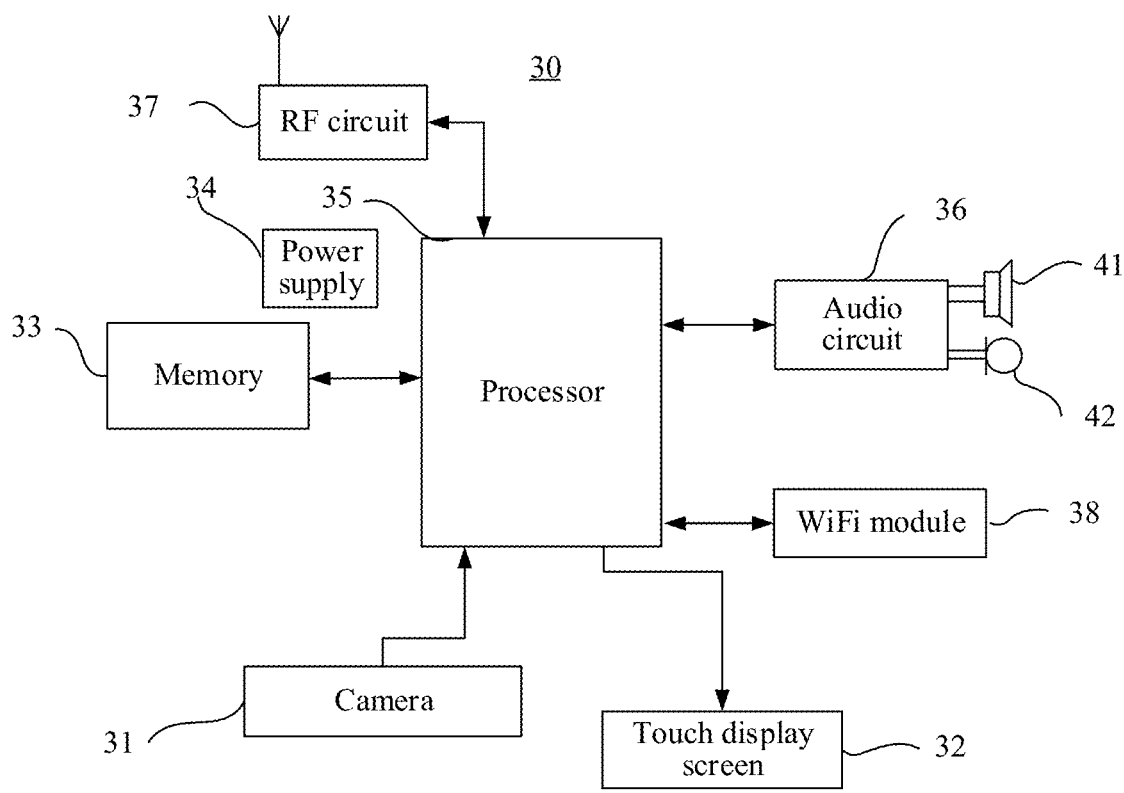
FIG. 3 illustrates a structure diagram of a terminal device according to an embodiment of the present disclosure.

As shown in FIG. 3, a terminal device 30 may include a camera 31, a display screen 32, a memory 33, a power supply 34, a processor 35, an audio circuit 36, a radio frequency (RF) circuit 37, a wireless fidelity (WiFi) module 38, and the like. A person skilled in the art may understand that the structure of the terminal device 30 shown in FIG. 3 does not constitute any limitation to the terminal device 30, and the terminal device 30 may include more components or fewer components than those shown in the figure, or some components may be combined, or a different component deployment may be used.

The camera 31 may be configured to scan the real world to acquire an image including an AR target, so as to trigger establishment of a virtual scene around the AR target by the terminal device. An AR game system is used as an example. After acquiring an AR target, the camera 31 may trigger the establishment of a virtual game scene by a game program in the terminal device 30.

The display screen 32 may be a normal display screen or may be a touch display screen (which is also referred to as a touch panel). An example in which the display screen 32 is a touch display screen is used. The display screen 32 may acquire a touch operation of the user on or near the display screen 32 (such as an operation of the user on or near the display screen 32 by using any suitable object or accessory such as a finger or a stylus), and drive a corresponding connection apparatus based on a preset program.

Optionally, the display screen 32 may include two parts: a touch detection apparatus and a touch controller. The touch detection apparatus may detect a touch position (or a touch area) of the user, detect a signal generated by the touch operation, and transfer the signal to the touch controller. The touch controller may receive touch information from the touch detection apparatus, convert the touch information into touch point coordinates, and transmit the touch point coordinates to the processor 35. In addition, the touch controller can receive and execute a command sent from the processor 35.

In addition, the display screen 32 may be implemented in various types such as a resistance type, a capacitance type, an infrared type, and a surface acoustic wave type. Certainly, in addition to the display screen 32, the terminal device 30 may further include another input device. Another input device may include one or more of a physical keyboard, a functional key (such as a volume control key or a power switch key), a track ball, a mouse, and a joystick.

The memory 33 may be configured to store software programs and modules. The processor 35 runs the software programs and the modules that are stored in the memory 33 to perform various functional applications of the terminal device 30 and data processing. A program storage area may be configured to temporarily store data generated in an execution process of a game program or store data inputted by a user, and the like. In addition, the memory 33 may include a high speed random access memory (RAM), and may also include a non-volatile memory, such as at least one magnetic disk storage device, a flash memory device, or another volatile solid storage device.

Using the AR game system as an example, the memory 33 may be configured to store a game program. To implement direct interaction (such as a direct click or swipe) between the user and some virtual objects in the virtual scene, storage areas may be separately configured for the virtual objects in the memory 33, to separately maintain object information of the virtual objects. Object information of a virtual object may include, for example, status information of the virtual object, and may include at least one of the following information of the virtual object: a color, a position, a shape, a size, and the like. When a virtual object is operated by the user and status information of the virtual object is changed accordingly, the processor 35 may update in real time status information of the virtual object that is stored in the memory 33. In addition to the status information of the virtual object, object information of the virtual object may further include label information (used for recognizing the virtual object) and spatial location information of the virtual object. This is not specifically limited in the embodiments of the present disclosure.

The power supply 34 may be logically connected to the processor 35 by using a power management system, thereby implementing functions such as charging, discharging, and power consumption management by using the power management system.

The processor 35 may be the control center of the terminal device 30, and is connected to various parts of the terminal device 30 by using various interfaces and lines. By running or executing the software program and/or module stored in the memory 33 and invoking data stored in the memory 33, the processor 35 performs various functions and data processing of the terminal device 30, thereby performing overall monitoring on the terminal device 30. Optionally, the processor 35 may include one or more processing units. Optionally, the processor 35 may integrate an application processor and a modem processor. The application processor mainly processes an operating system, a user interface, an application program, and the like. The modem processor mainly processes wireless communication. It may be understood that the foregoing modem processor may be not integrated into the processor 35.

The audio circuit 36, a speaker 41, and a microphone 42 may provide audio interfaces between the user and the terminal device 30. The audio circuit 36 may convert received audio data into an electrical signal and transmit the electrical signal to the speaker 41. The speaker 41 converts the electrical signal into a sound signal for output. In addition, the microphone 42 converts an acquired sound signal into an electrical signal. The audio circuit 36 receives the electrical signal, converts the electrical signal into audio data, and outputs the audio data to the RF circuit 37 to transmit the audio data to, for example, another terminal device, or outputs the audio data to the memory 33 for further processing. The AR game system is used as an example. After entering the game scene, the terminal device 30 may play a game sound by using the speaker 41. The user may communicate with another player by voice by using the microphone 42.

The RF circuit 37 may be configured to receive and transmit signals during an information receiving and transmitting process or a call process. Specifically, the RF circuit 37 receives downlink information from a base station, then delivers the downlink information to the processor 35 for processing, and transmits uplink data to the base station. Generally, the RF circuit 37 includes an antenna, at least one amplifier, a transceiver, a coupler, a low noise amplifier (LNA), and a duplexer. In addition, the RF circuit 37 may also communicate with a network and another device by means of wireless communication. The wireless communication may use any communication standard or protocol, including, but not limited to, a global system for mobile communications (GSM), a general packet radio service (GPRS), code division multiple access (CDMA), wideband code division multiple access (WCDMA), long term evolution (LTE), new radio (NR), an email, and a short messaging service (SMS).

The user may be connected to a local area network by using the WiFi module 38, and exchange data in real time. The AR game system is used as an example. A user may use the WiFi module 38 to play a game in the same virtual scene with another user in a local area network. During a game, game data may be exchanged in real time between the users by using the WiFi module 38. For example, when a user performs a touch control operation on a virtual object in the virtual scene and object information of the virtual object is changed accordingly, the user may transmit instruction information to a terminal device of another user by using the WiFi module 38 to instruct the terminal device of the another user to update the object information of the virtual object, so that object information of the virtual object that is stored on the terminal devices of the users are kept consistent.

Figure 4:
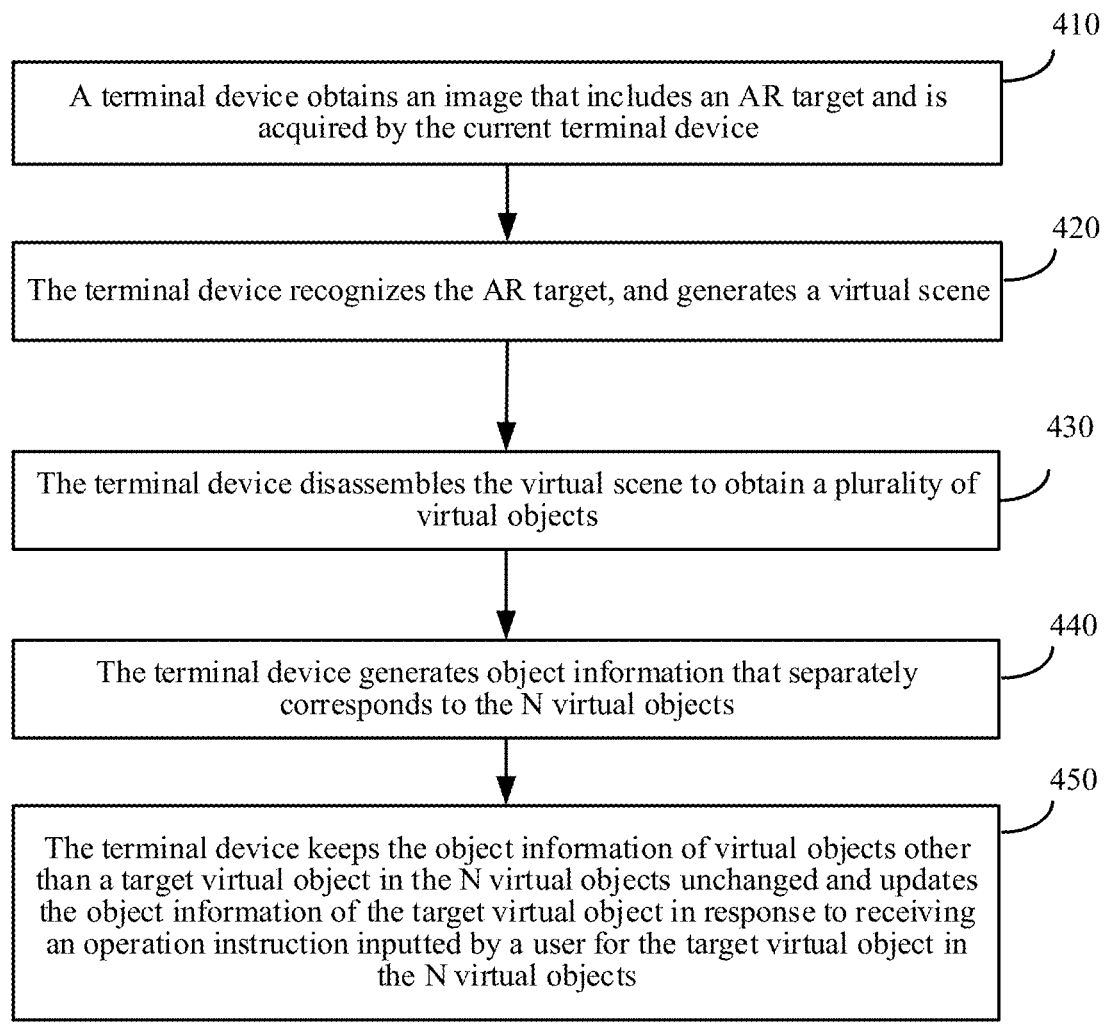
FIG. 4 illustrates a flowchart of an information processing method according to an embodiment of the present disclosure.

FIG. 4 is a schematic flowchart of an information processing method according to an embodiment of the present disclosure. The method shown in FIG. 4 may be performed by a current terminal device or be performed by a processor in the current terminal device. The current terminal device may be, for example, the terminal device 30 shown in FIG. 3.

As shown in FIG. 4, the information processing method includes the following steps or processes.

410: The terminal device obtains an image that includes an AR target and is acquired by the current terminal device.

For example, the terminal device may scan the real world by using a camera of the current terminal device, to obtain the image including the AR target.

420: The terminal device recognizes the AR target in the image, and generates a virtual scene, the virtual scene including N number of virtual objects, each of the N virtual objects having corresponding object information, and N being an integer greater than or equal to 2.

In some embodiments, step 420 may include: obtaining, by the terminal device, spatial location information of the AR target; and generating the virtual scene according to the spatial location information of the AR target and a pre-established one-to-one correspondence between the spatial location information of the AR target and the spatial location information of the virtual scene.

Specifically, for an AR technology, a virtual scene is usually established around an AR target. There is a correspondence (or a binding relationship) between a spatial location of the virtual scene and a spatial location of the AR target. Therefore, to generate the virtual scene, it usually needs to be determined whether an image includes an AR target before spatial location information of the AR target is obtained. It may be determined in various manners whether an image includes an AR target. For example, some image recognition algorithms may be used to determine whether an image includes an AR target. For example, object features of an AR target may be pre-recorded. As a user uses a camera of a current terminal device to acquire an image from the real world, the current terminal device may use an image recognition algorithm to recognize an object that appears in the image. Once it is recognized that an object feature of an object is the same as a pre-recorded object feature of an AR target, it can be determined that the AR target is recognized from the image.

Further, if it is recognized that the image includes the AR target, a spatial location of the AR target may be determined according to a position of the AR target in the image and a current viewing angle of the camera. Subsequently, after the spatial location of the AR target is determined, a spatial location of a virtual scene may be determined according to the spatial location of the AR target and a pre-recorded correspondence between the spatial location of the AR target and the spatial location of the virtual scene, and the virtual scene may then be generated at the spatial location of the virtual scene. By using the foregoing steps, the AR scene combining virtual world and the real world may be formed. The AR scene includes both information (for example, an AR target) from the real world and virtual information (a virtual object in the virtual scene).

The spatial location information of the AR target may be used for indicating a spatial location (for example, three-dimensional coordinates in the real world) of the AR target in the real world (or physical space). Similarly, the spatial location information of the virtual scene may be used for indicating a spatial location (for example, three-dimensional coordinates in the real world) of the virtual scene in the real world (or physical space). For example, the spatial location information of the virtual scene may be represented by a relative position relationship between the virtual scene and the AR target.

Step 430. The terminal device disassembles the virtual scene to obtain a plurality of virtual objects (e.g., N number of virtual objects).

The virtual scene generated in step 420 includes the plurality of virtual objects. In this case, the virtual scene may be a complete model. To implement an interaction task described in the following, the virtual scene first needs to be disassembled to obtain the plurality of virtual objects.

For example, the virtual scene may be first generally generated, and the virtual scene is then disassembled to obtain N virtual objects. For example, at a design stage of an AR system, N virtual objects with which the user can separately interact may be first selected from the virtual scene. A particular model segmentation algorithm may then be used to extract sub-models of the N virtual objects from a model of the virtual scene. Subsequently, sub-model data of the N virtual objects may be stored in model data of the virtual scene to be invoked by the AR system during actual operation. During an actual operation stage of the AR system, once the AR target is recognized, the entire model of the virtual scene may be first invoked to generate the virtual scene. The sub-model data that separately corresponds to the N virtual objects may then be extracted from the model data of the virtual scene. Obtaining the sub-model data that separately corresponds to the N virtual objects from the model data of the virtual scene is equivalent to disassembling the virtual scene to obtain the N virtual objects. Subsequently, the N virtual objects may be independently displayed and controlled.

440: The terminal device generates object information that separately corresponds to the N virtual objects.

Before interaction with the N virtual objects, the object information of the N virtual objects needs to be generated and stored first. During actual interaction, the object information of the N virtual objects may be independently maintained or updated, so that the user can separately interact with the virtual objects.

An example in which the object information of the virtual objects includes label information, spatial location information, and status information of the virtual objects is used. After the virtual scene is disassembled to obtain the N virtual objects, a label (used for recognizing the virtual object) may be assigned to each of the N virtual objects, and a current spatial location and a current status of each virtual object are determined. Subsequently, values of label information, spatial location information, and status information in object information of the virtual object may be assigned according to the label, the current spatial location, and the current status of the virtual object, to obtain initial values of the spatial location information, the label information, and the status information of the virtual object. When the user operates a virtual object and a spatial location and/or a status of the virtual object is changed accordingly, the change may be recorded by modifying values of spatial location information and/or status information of the virtual object, so as to implement separate interaction between the user and the virtual object.

450: The terminal device keeps the object information of virtual objects other than a target virtual object in the N virtual objects unchanged and updates the object information of the target virtual object in response to receiving an operation instruction inputted by a user for the target virtual object in the N virtual objects. The target virtual object may refer to one or more specific virtual object to be interacted with by the user.

For a conventional AR system, the entire virtual scene is modeled as a whole. Therefore, the virtual objects in the virtual scene are mutually associated to form the whole virtual scene, and the user cannot separately interact with a virtual object in the virtual scene. In an embodiment of the present disclosure, the N virtual objects in the virtual scene are decoupled from each other. The models of the N virtual objects are mutually independent, and each model has corresponding object information. In this way, when the user separately interacts with a target virtual object, the object information of other virtual objects may be kept unchanged, and only object information of the target virtual object is changed.

In one embodiment, the N virtual objects in the virtual scene are mutually independent, and each virtual object has corresponding object information such as status information and label information, so that the user can independently interact with the virtual objects in the virtual scene, to facilitate separate interaction with a virtual object without affecting statuses, labels, and the like of other virtual objects, thereby improving the interactivity of an AR system.

Object information of a virtual object may include at least one of the following information of the virtual object: spatial location information, status information, and label information. The label information of the virtual object may be used for recognizing the virtual object or may be used for distinguishing the virtual object from other virtual objects. The spatial location information of the virtual object may be used for indicating a spatial location of the virtual object, for example, three-dimensional coordinates of the virtual object in the real world. The spatial location information of the virtual object may be, for example, represented by using a relative relationship between spatial locations of the virtual object and the AR target. The status information of the virtual object may be used for indicating a current status of the virtual object. The status information of the virtual object may include a shape, a color, and the like of the virtual object. The status information of the virtual object may be set according to an actual requirement, and is not specifically limited in one embodiment. For example, the virtual object is glass in a door or window, the user may break the glass by clicking the glass, and the status information of the virtual object may then be used for indicating whether the glass is broken.

In one embodiment, the N virtual objects may have models independent of each other. A manner of generating the N virtual objects is described in detail below.

The type of the operation instruction in step 450 is not specifically limited. The operation instruction may be an operation instruction inputted by using a physical key or a virtual key or may be a touch operation instruction inputted through a display screen of the current terminal device. An example in which the operation instruction in step 450 is a touch operation instruction is used for description.

In some embodiments, before step 450, the method in FIG. 4 may further include: obtaining touch position information corresponding to the touch operation instruction; extracting spatial location information of the N virtual objects from the object information of the N virtual objects; determining display position information of the N virtual objects on the display screen according to the spatial location information of the N virtual objects; and selecting the target virtual object of the touch operation instruction from the N virtual objects according to the touch position information and the display position information.

Accordingly, the technical solution provided in the present disclosure supports independent touch interaction between the user and each virtual object, thereby further improving the interactivity of the AR system.

For the AR system, the spatial location of the virtual scene changes as the camera moves. Therefore, touch operation instructions inputted by the user at the same touch position on the display screen at different moments may be used for different target virtual objects. Therefore, during the operation of the AR system, the display position information of the N virtual objects on the display screen may be first determined according to the spatial location information of the N virtual objects. Subsequently, a virtual object whose display position is located at the touch position may be determined as the target virtual object of the touch operation instruction. The display position information of the virtual object on the display screen may be determined in a plurality of manners. This is not specifically limited. For example, the spatial location of the virtual object may be projected along a current viewing angle of the user onto the display screen based on the spatial location information of the virtual object, to obtain the display position information of the virtual object on the display screen.

The type of a touch operation corresponding to the touch operation instruction is not specifically limited. For example, the touch operation may include at least one of the following operations: a click operation, a swipe operation, a zoom-in operation, a zoom-out operation, and a rotation operation.

Further, the function of the touch operation instruction is not specifically limited, and may be set according to an actual requirement. For example, the touch operation is a click operation, and the touch operation instruction may be used for controlling the target virtual object to slide in a click direction. Further, a slide distance of the target virtual object may be directly proportional to an operation force of the click operation. In another example, the touch operation is a click operation, and the touch operation instruction may be used for controlling the target virtual object to deform. Further, the degree by which the target virtual object deforms may be directly proportional to an operation force of the click operation. In still another example, the touch operation is a swipe operation, and the touch operation instruction may be used for controlling the target virtual object to slide along a sliding trajectory. In still another example, the touch operation is a swipe operation, and the touch operation instruction may be used for deleting the target virtual object on the sliding trajectory from the virtual scene.

The target virtual object may be a virtual object or may be a plurality of virtual objects. The target virtual object may be understood as a virtual object of the touch operation instruction or as an operation object of the touch operation instruction.

Figure 5:
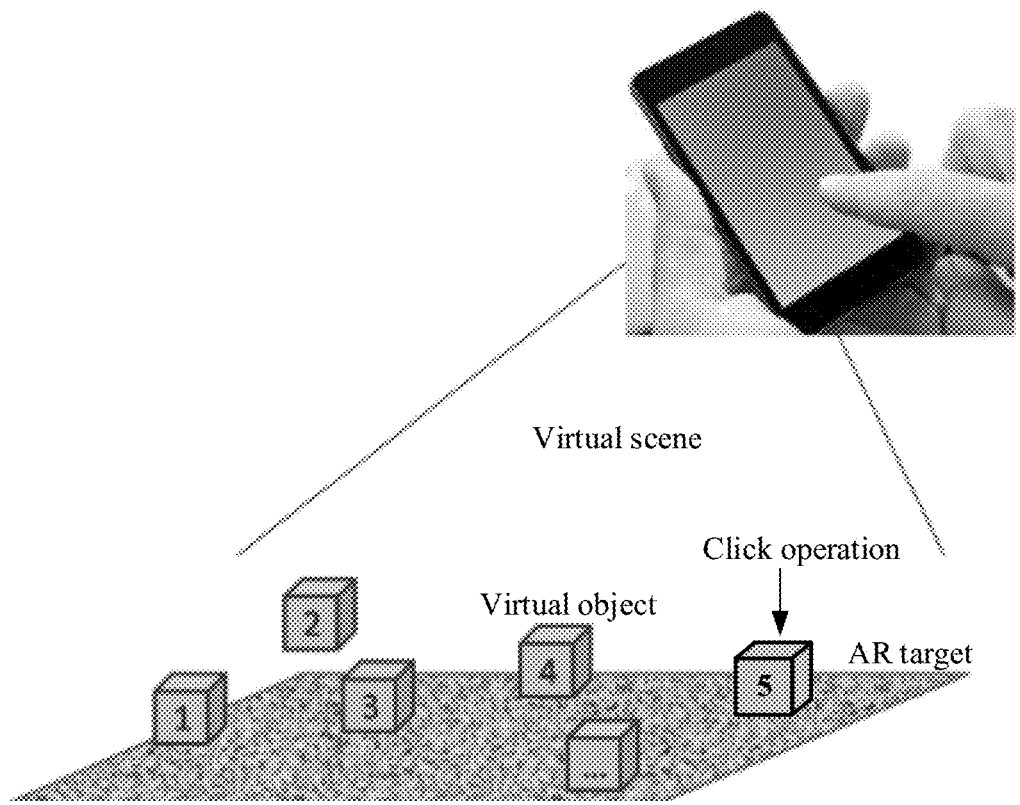
FIG. 5 illustrates a virtual scene according to an embodiment of the present disclosure.

FIG. 5 is used as an example, and it is assumed that the AR target is a floor with marble texture. The current terminal device may use the camera to acquire an image including the floor with the marble texture and establish the virtual scene shown in FIG. 5 by recognizing the floor with the marble texture in the image. The virtual scene includes virtual objects such as a virtual object 1, a virtual object 2, a virtual object 3, a virtual object 4, and a virtual object 5. It is assumed that the touch operation is a click operation for the virtual object 5 shown in FIG. 5, and it is assumed that the function of an operation instruction of the click operation is to press the height of the virtual object 5. After the current terminal device executes the operation instruction of the click operation, the height of the virtual object 5 is reduced from the height shown in FIG. 5 to the height shown in FIG. 5.

Using the method in FIG. 4 is applied to an AR game system as an example, in one embodiment, an AR game system is provided in which a display screen is used to provide direct touch interaction with objects in a virtual scene. The game system may enable a player to have the experience of touching a task object in a game in the real world. Further, the game system may update object information of the touched task object in real time to provide a real-time feedback to a touch operation of the player.

In some embodiments, the method in FIG. 4 may further include: transmitting first instruction information to another terminal device, where the first instruction information is used for instructing the another terminal device to update the object information of the target virtual object, so that the object information of the target virtual object that is stored on the another terminal device is kept consistent with the object information of the target virtual object that is stored on the current terminal device.

The content of the first instruction information is not specifically limited. For example, the first instruction information may include the object information of the target virtual object on the current terminal device. After receiving the first instruction information, the another terminal device directly uses the object information in the first instruction information to replace the object information of the target virtual object on the another terminal device. In another example, the first instruction information may include information indicating the type of a touch operation performed on the target virtual object. After receiving the first instruction information, the another terminal device may perform the same touch operation on the target virtual object, so that the object information of the target virtual object on the another terminal device is kept consistent with the object information of the target virtual object on the current terminal device.

Similarly, when a user of the another terminal device performs a touch operation on at least one virtual object in the same virtual scene, and object information of the at least one virtual object is changed accordingly, instruction information may be transmitted to instruct the current terminal device and the another terminal device to synchronize object information of the virtual objects in the virtual scene.

Specifically, the method in FIG. 4 may further include: receiving second instruction information transmitted by the another terminal device, where the second instruction information is used for instructing the current terminal device to update object information of at least one virtual object in the N virtual objects; and updating the object information of the at least one virtual object according to the second instruction information, so that object information of the at least one virtual object that is stored on the current terminal device is kept consistent with object information of the at least one virtual object that is stored on the another terminal device.

The content of the second instruction information is not specifically limited. For example, the second instruction information may include the object information of at least one virtual object on the another terminal device. After receiving the second instruction information, the current terminal device directly uses the object information in the second instruction information to replace the object information of the at least one virtual object on the current terminal device. In another example, the second instruction information may include information indicating the type of a touch operation performed on the at least one virtual object. After receiving the second instruction information, the current terminal device may perform the same touch operation on the at least one virtual object, so that the object information of the at least one virtual object on the current terminal device is kept consistent with object information of the at least one virtual object on the another terminal device.

In one embodiment, a plurality of users may be enabled to interact with virtual objects in the same virtual scene. After a virtual object in the virtual scene is operated by a user to generate new object information, the object information of the virtual object can be fed back or synchronized to a terminal device of another user, thereby providing more varied interaction manners of the AR system and improving the sensory experience of the users.

An AR game system is used as an example. The present disclosure practically provides an AR game system that allows a plurality of players to perform the same game task. During a game, a task that has been executed by a player may be fed back to a game interface of another player in time, thereby improving game experience of the players.

A communication manner between the current terminal device and the another terminal device is not specifically limited in one embodiment. A wired connection manner may be used or a wireless connection manner may be used. For example, the current terminal device and the another terminal device may be connected based on WiFi.

Figure 6:
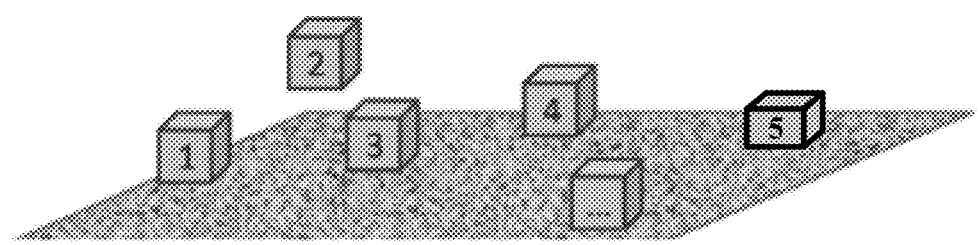
FIG. 6 illustrates a virtual scene according to another embodiment of the present disclosure.

One embodiment is further described below in detail with reference to FIG. 5 to FIG. 7 by using an example in which the AR system is applied to a game scene. The examples in FIG. 5 to FIG. 7 are merely intended to help a person skilled in the art understand embodiments of the present disclosure, instead of being limiting to the specific illustrated numerical values or the illustrated specific scene.

Figure 7:
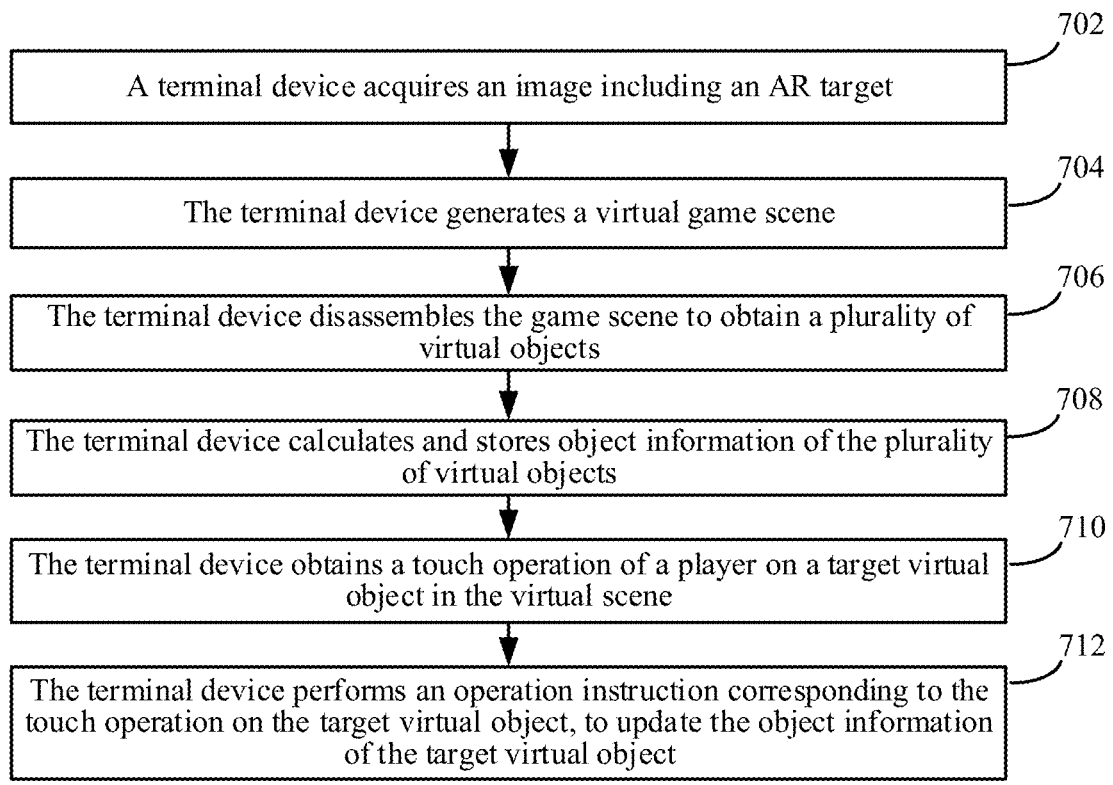
FIG. 7 illustrates a flowchart of an AR-based game process according to an embodiment of the present disclosure.

FIG. 7 is a schematic flowchart of an AR-based game process according to an embodiment of the present disclosure. As shown in FIG. 7, the game process may include the followings.

702: A terminal device acquires an image including an AR target.

As shown in FIG. 5, the AR target may be a marble floor in FIG. 5. The terminal device may use a camera to scan the marble floor to trigger the generation of a virtual game scene by a game program in the terminal device.

704: The terminal device generates a virtual game scene.

As shown in FIG. 5, there is a binding relationship between a spatial location of the game scene (including virtual objects 1 to 5 and the like) and a spatial location of the marble floor. Once the marble floor is recognized and the spatial location of the marble floor is determined, the spatial location of the game scene may be determined. The game scene may then be generated at the corresponding spatial location. This is equivalent to adding the virtual game scene to the real world in which the AR target is located to produce the effect of combining the virtual world and the real world.

706: The terminal device disassembles the game scene to obtain a plurality of virtual objects (e.g., N number of virtual objects).

The game scene generated in step 704 includes a plurality of virtual objects (the virtual objects 1 to 5 shown in FIG. 5) and the game scene may be a complete model. To implement a game interaction task described in the following, the game scene first needs to be disassembled to obtain the plurality of virtual objects.

Specifically, at a design stage of a game, some virtual objects in the game scene may be selected as interactive virtual objects according to a requirement of a game task. Subsequently, the entire model of the game scene may be disassembled manually or by using 3D modeling software to obtain sub-model data of the virtual objects. Subsequently, the sub-model data of the virtual objects may be added to model data of the game scene for use in an operation stage of the game. During the operation stage of the game, the game program may generate the entire model of the game scene first, and then read the sub-model data of the virtual objects from the model data of the game scene, to rapidly disassemble the game scene to obtain the plurality of virtual objects.

708: The terminal device calculates and stores object information of the plurality of virtual objects.

As shown in FIG. 5, a label may first be assigned to each virtual object obtained through disassembling, to recognize an identity of the virtual object, for example, the virtual object 1, the virtual object 2 or the like in FIG. 5.

Subsequently, an independent spatial location of each virtual object may be calculated according to spatial location information of the game scene and relative spatial locations of the virtual objects in the game scene. In a conventional AR technology, a virtual scene remains modeled as a whole. Therefore, only a spatial location of the virtual scene and a spatial location of an AR target are recorded. In one embodiment, both the spatial location of the AR target and the spatial locations of the virtual objects are recorded. This is equivalent to that a "one-to-one" correspondence is replaced with a "one-to-many" correspondence.

Further, statuses of the virtual objects obtained through disassembling may be recorded. The statuses of the virtual objects are associated with a game task, and may be flexibly set according to an actual requirement. For example, in one embodiment, the game task may be set to be quickly clicking the virtual objects to crush the virtual objects, and the statuses of the virtual objects may be the heights of the virtual objects.

Subsequently, values may be assigned to label information, spatial location information, and status information in the object information of the virtual objects according to the labels and the spatial locations of the virtual objects that are obtained through the foregoing calculation and the statuses of the virtual objects, to obtain initial object information of the virtual objects. The initial object information of the virtual objects may then be stored into a memory. Further, in a multi-player game scene, each player may transmit object information of virtual objects to another player, to implement information synchronization between the players.

710: The terminal device obtains a touch operation of a player on a target virtual object in the virtual scene.

As shown in FIG. 5, a touch operation instruction may be a click operation instruction. The player may click different virtual objects to crush the different virtual objects.

712: The terminal device performs the touch operation instruction on the target virtual object and updates the object information of the target virtual object.

As shown in FIG. 5 and FIG. 6, assuming that a player clicks the virtual object 5, the game program may reduce the height of the virtual object 5 from the height shown in FIG. 5 to the height shown in FIG. 6 to crush the virtual object 5 and keep the heights of other virtual objects unchanged.

Further, in a multi-player game scene, if a player on another terminal device clicks another virtual object (for example, the virtual object 2), instruction information may be transmitted to the current terminal device in a WiFi manner or the like. After receiving the instruction information, the current terminal device may update object information of the virtual object 2, so that status information of the virtual object 2 is updated to a crushed state, thereby implementing synchronization between game processes of the plurality of players. Finally, the number of virtual objects separately clicked by the plurality of players may be calculated. A player that clicks the most virtual objects may be set as the winner of the game, so that a multi-player game is implemented.

The following describes an apparatus embodiment of the present disclosure. The apparatus embodiment may perform the foregoing method. Therefore, refer to the foregoing method embodiments for the part that is not described in detail.

Figure 8:
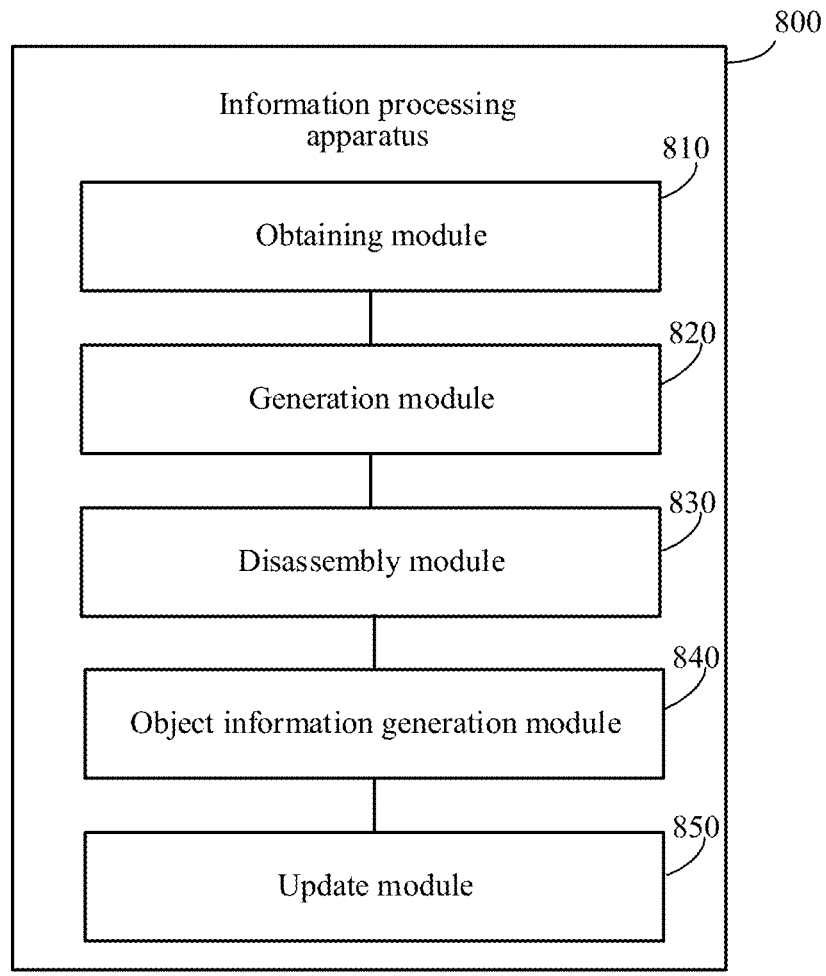
FIG. 8 illustrates a schematic structural diagram of an information processing apparatus according to an embodiment of the present disclosure.

FIG. 8 is a schematic structural diagram of an information processing apparatus according to an embodiment of the present disclosure. An information processing apparatus 800 in FIG. 8 may include: an obtaining module 810, a generation module 820, a disassembly module 830, an object information generation module 840, and an update module 850, etc.

The obtaining module 810 is configured to obtain an image that includes an AR target and is acquired by a current terminal device. The generation module 820 is configured to: recognize the AR target, and generate a virtual scene, the virtual scene including N virtual objects, and N being an integer greater than or equal to 2. The disassembly module 830 is configured to disassemble the virtual scene to obtain the N virtual objects before the update module 830 updates the object information of the target virtual object.

Further, the object information generation module 840 is configured to generate object information that separately corresponds to the N virtual objects. The update module 850 is configured to keep the object information of virtual objects other than a target virtual object in the N virtual objects unchanged and update the object information of the target virtual object in response to receiving an operation instruction inputted by a user for the target virtual object in the N virtual objects.

In one embodiment, the N virtual objects in the virtual scene are mutually independent, and each virtual object has the corresponding object information, so that a user can independently interact with the virtual objects in the virtual scene, thereby improving the interactivity of an AR system.

In some embodiments, the apparatus 800 further includes (not shown): a transmission module, configured to transmit first instruction information to another terminal device, where the first instruction information is used for instructing the another terminal device to update the object information of the target virtual object, so that the object information of the target virtual object that is stored on the another terminal device is kept consistent with the object information of the target virtual object that is stored on the current terminal device.

In some embodiments, the apparatus 800 further includes (not shown): a receiving module, configured to receive second instruction information transmitted by the another terminal device, where the second instruction information is used for instructing the current terminal device to update object information of at least one virtual object in the N virtual objects, where the update module 830 is further configured to update the object information of the at least one virtual object according to the second instruction information, so that object information of the at least one virtual object that is stored on the current terminal device is kept consistent with object information of the at least one virtual object that is stored on the another terminal device.

In some embodiments, the apparatus 800 further includes (not shown): a storage module, configured to store the object information that separately corresponds to the N virtual objects.

In some embodiments, sub-model data that separately corresponds to the N interactive virtual objects is pre-recorded in model data of the virtual scene, and the disassembly module is specifically configured to extract the sub-model data that separately corresponds to the N virtual objects from the model data of the virtual scene.

In some embodiments, the generation module 820 is specifically configured to: obtain spatial location information of the AR target, and generate the virtual scene according to the spatial location information of the AR target and a pre-established one-to-one correspondence between the spatial location information of the AR target and spatial location information of the virtual scene.

In some embodiments, the operation instruction is a touch operation instruction inputted by the user through a display screen of the current terminal device, and before the update module 850 updates the object information of the target virtual object, the obtaining module 810 is further configured to obtain touch position information corresponding to the touch operation instruction, and the apparatus 800 further includes: an extraction module, configured to extract spatial location information of the N virtual objects from the object information of the N virtual objects; a determining module, configured to determine display position information of the N virtual objects on the display screen according to the spatial location information of the N virtual objects; and a selection module, configured to select the target virtual object of the touch operation instruction from the N virtual objects according to the touch position information and the display position information.

In some embodiments, object information of each of the N virtual objects includes at least one of the following information of the virtual object: spatial location information, status information, and label information.

Figure 9:
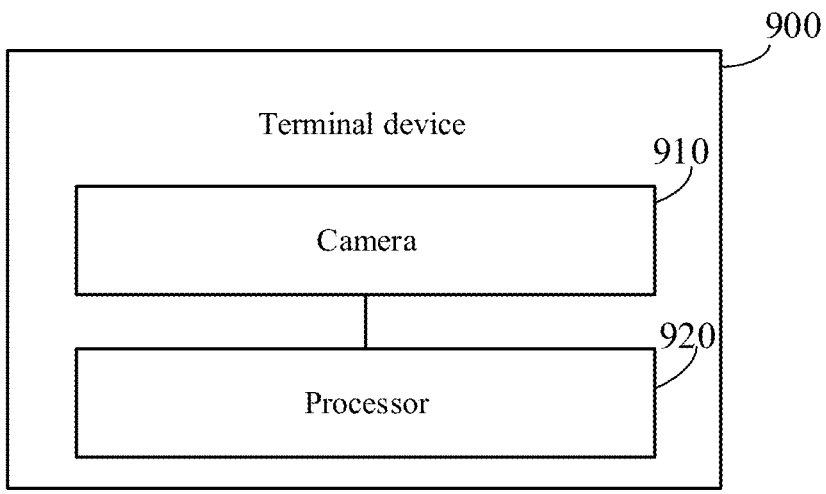
FIG. 9 illustrates a schematic structural diagram of a terminal device according to an embodiment of the present disclosure.

FIG. 9 is a schematic structural diagram of a terminal device according to an embodiment of the present disclosure. As shown in FIG. 9, the terminal device 900 may include a camera 910 and a processor 920. In some embodiments, the terminal device 900 may use, for example, an implementation form of the terminal device 30 shown in FIG. 3. The camera 910 may correspond to the camera 31 in the terminal device 30, and the processor 920 may correspond to the processor 35 in the terminal device 30. The structure of the terminal device 900 is described in detail below.

The camera 910 may be configured to acquire an image including an AR target.

The processor 920 is connected to the camera 910, and may be configured to: recognize the AR target, and generate a virtual scene, the virtual scene including N virtual objects, each of the N virtual objects having corresponding object information, and N being an integer greater than or equal to 2; disassemble the virtual scene to obtain the N virtual objects, and generate object information that separately corresponds to the N virtual objects; and keep the object information of virtual objects other than a target virtual object in the N virtual objects unchanged and update the object information of the target virtual object in response to receiving an operation instruction inputted by a user for the target virtual object in the N virtual objects.

In one embodiment, the N virtual objects in the virtual scene are mutually independent, and each virtual object has the corresponding object information, so that a user can independently interact with the virtual objects in the virtual scene, thereby improving the interactivity of an AR system.

In some embodiments, the terminal device 900 further includes (not shown): a transmitter, configured to transmit first instruction information to another terminal device, where the first instruction information is used for instructing the another terminal device to update the object information of the target virtual object, so that the object information of the target virtual object that is stored on the another terminal device is kept consistent with the object information of the target virtual object that is stored on the terminal device 900.

In some embodiments, the terminal device 900 further includes (not shown): a receiver, configured to receive second instruction information transmitted by the another terminal device, where the second instruction information is used for instructing the terminal device 900 to update object information of at least one virtual object in the N virtual objects, where the processor 920 is further configured to update the object information of the at least one virtual object according to the second instruction information, so that object information of the at least one virtual object that is stored on the terminal device 900 is kept consistent with object information of the at least one virtual object that is stored on the another terminal device.

In some embodiments, the processor 920 is further configured to store the object information that separately corresponds to the N virtual objects.

In some embodiments, sub-model data that separately corresponds to the N interactive virtual objects is pre-recorded in model data of the virtual scene, and the processor 920 is specifically configured to extract the sub-model data that separately corresponds to the N virtual objects from the model data of the virtual scene.

In some embodiments, the processor 920 is specifically configured to: obtain spatial location information of the AR target, and generate the virtual scene according to the spatial location information of the AR target and a pre-established one-to-one correspondence between the spatial location information of the AR target and spatial location information of the virtual scene.

In some embodiments, the operation instruction is a touch operation instruction inputted by the user through a display screen of the terminal device 900, and the processor 920 is further configured to: before the updating the object information of the target virtual object, obtain touch position information corresponding to the touch operation instruction; extract spatial location information of the N virtual objects from the object information of the N virtual objects; determine display position information of the N virtual objects on the display screen according to the spatial location information of the N virtual objects; and select the target virtual object of the touch operation instruction from the N virtual objects according to the touch position information and the display position information.

In some embodiments, object information of each of the N virtual objects includes at least one of the following information of the virtual object: spatial location information, status information, and label information.

Accordingly, using the disclosed embodiments, N virtual objects in a virtual scene are mutually independent, and each virtual object has corresponding object information, so that a user can independently interact with the virtual objects in the virtual scene, thereby improving the interactivity of an AR system.

In the foregoing embodiments, implementation may be entirely or partially performed by using software, hardware, firmware or any combination thereof. When software is used to implement the embodiments, all or some of the embodiments may be implemented in the form of a computer program product. The computer program product includes one or more computer instructions. When loaded and executed on a computer, the computer program instructions all or partially generate procedures or functions described according to the embodiments of the present disclosure. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any usable medium accessible by the computer, or a data storage device, such as a server or a data center, integrating one or more usable media. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by using hardware or software depends on particular applications and design constraint conditions of the technical solutions. A person skilled in the art may use different methods to implement the described functions for the particular applications, but it is not to be considered that the implementation goes beyond the scope of the present disclosure.

In the embodiments provided in the present disclosure, it is to be understood that the disclosed system, apparatus, and method may be implemented in other manners. For example, the apparatus embodiments described above are merely exemplary. For example, the unit division is merely logical function division and may have other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on a plurality of network units. Some of or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall subject to the protection scope of the claims.

What is claimed is:

1. An information processing method for a first terminal device, a game task of a multi-player game client being run on the first terminal device, the method comprising:
   obtaining an image that includes an augmented reality (AR) target and is acquired by the first terminal device;
   recognizing the AR target, and determining a spatial location of the AR target;
   generating a virtual scene according to the spatial location of the AR target and a pre-established spatial location relationship between the AR target and the virtual scene, the virtual scene including N virtual objects, the N virtual objects including a first virtual object and a second virtual object spaced apart from the first virtual object, and N being an integer greater than or equal to 2;
   disassembling the virtual scene to obtain the N virtual objects, and generating object information that separately corresponds to the N virtual objects, including:
   determining independent spatial location information of each of the N virtual objects according to spatial location information of the virtual scene, relative spatial locations of the virtual objects in the virtual scene, and the spatial location relationship between the AR target and the virtual scene, wherein the spatial location information of each of the N virtual objects is represented by separate relative relationship between a spatial location of each of the N virtual objects and the spatial location of the AR target;
   updating the object information of the second virtual object and keeping the object information of the first virtual object unchanged, in response to receiving an operation instruction inputted by the user for the second virtual object in the N virtual objects, the updated object information of the second virtual object including the spatial location information of the second virtual object; and
   transmitting the updated object information of the second virtual object to a second terminal device, the game task of the multi-player game client being also run on the second terminal device.

2. The method according to claim 1, further comprising:
   storing in model data of the virtual scene, first sub-model data corresponding to the first virtual object and second sub-model data corresponding to the second virtual object;
   in response to the AR target being recognized, invoking the model data of the virtual scene to generate the virtual scene;
   after invoking the model data and generating the virtual scene, extracting the first sub-model data and the second sub-model data from the model data of the virtual scene when disassembling the virtual scene to obtain the N virtual objects; and
   independently displaying and controlling the N virtual objects after the object information that separately corresponds to the N virtual objects are generated.

3. The method according to claim 1, further comprising:
   decoupling the N virtual objects; and
   causing the N virtual objects to be decoupled from each other.

4. The method according to claim 1, wherein the operation instruction includes a click operation instruction, and the method further comprises:
   causing to have different virtual objects clicked and to have the different virtual objects crushed thereafter.

5. The method according to claim 1, further comprising:
   creating a one-to-many correspondence in spatial location information between the AR target and the N virtual objects in the virtual scene.

6. The method according to claim 1, further comprising:
   receiving a selection of a target virtual object from the N virtual objects; and
   displaying position information of the target virtual object as selected.

7. The method according to claim 1, wherein the second virtual object includes glass in a door or window, the method further comprises:
   receiving a click operation on the glass; and
   causing the glass to appear broken; and
   updating status information of the second virtual object to indicate the glass being broken.

8. The method according to claim 1, wherein the second virtual object represents a group of second virtual objects, and the method further comprises:
   recording a number of the second virtual objects being crushed in height; and identifying a winner of the game task of the multi-player game client according to the number of the second virtual objects being crushed in height.

9. A terminal device, comprising: a memory; and a processor coupled to the memory and configured to perform:
obtaining an image that includes an augmented reality (AR) target and is acquired by the first terminal device;
recognizing the AR target, and determining a spatial location of the AR target;
generating a virtual scene according to the spatial location of the AR target and a pre-established spatial location relationship between the AR target and the virtual scene, the virtual scene including N virtual objects, the N virtual objects including a first virtual object and a second virtual object spaced apart from the first virtual object, and N being an integer greater than or equal to 2;
disassembling the virtual scene to obtain the N virtual objects, and generating object information that separately corresponds to the N virtual objects, including: determining independent spatial location information of each of the N virtual objects according to spatial location information of the virtual scene, relative spatial locations of the virtual objects in the virtual scene, and the spatial location relationship between the AR target and the virtual scene, wherein the spatial location information of each of the N virtual objects is represented by separate relative relationship between a spatial location of each of the N virtual objects and the spatial location of the AR target;
updating the object information of the second virtual object and keeping the object information of the first virtual object unchanged, in response to receiving an operation instruction inputted by the user for the second virtual object in the N virtual objects, the updated object information of the second virtual object including the spatial location information of the second virtual object; and
transmitting the updated object information of the second virtual object to a second terminal device, the game task of the multi-player game client being also run on the second terminal device.

10. The terminal device according to claim 9, wherein the processor is further configured to perform:
storing in model data of the virtual scene, first sub-model data corresponding to the first virtual object and second sub-model data corresponding to the second virtual object;
in response to the AR target being recognized, invoking the model data of the virtual scene to generate the virtual scene;
after invoking the model data and generating the virtual scene, extracting the first sub-model data and the second sub-model data from the model data of the virtual scene when disassembling the virtual scene to obtain the N virtual objects; and
independently displaying and controlling the N virtual objects after the object information that separately corresponds to the N virtual objects are generated.

11. A non-transitory computer-readable storage medium storing computer program instructions executable by at least one processor of a terminal device to perform:
obtaining an image that includes an augmented reality (AR) target and is acquired by the first terminal device;
recognizing the AR target, and determining a spatial location of the AR target;
generating a virtual scene according to the spatial location of the AR target and a pre-established spatial location relationship between the AR target and the virtual scene, the virtual scene including N virtual objects, the N virtual objects including a first virtual object and a second virtual object spaced apart from the first virtual object, and N being an integer greater than or equal to 2;
disassembling the virtual scene to obtain the N virtual objects, and generating object information that separately corresponds to the N virtual objects, including: determining independent spatial location information of each of the N virtual objects according to spatial location information of the virtual scene, relative spatial locations of the virtual objects in the virtual scene, and the spatial location relationship between the AR target and the virtual scene, wherein the spatial location information of each of the N virtual objects is represented by separate relative relationship between a spatial location of each of the N virtual objects and the spatial location of the AR target;
updating the object information of the second virtual object and keeping the object information of the first virtual object unchanged, in response to receiving an operation instruction inputted by the user for the second virtual object in the N virtual objects, the updated object information of the second virtual object including the spatial location information of the second virtual object; and
transmitting the updated object information of the second virtual object to a second terminal device, the game task of the multi-player game client being also run on the second terminal device.

12. The non-transitory computer-readable storage medium according to claim 11, wherein the computer program instructions are executable by at least one processor to further perform:
storing in model data of the virtual scene, first sub-model data corresponding to the first virtual object and second sub-model data corresponding to the second virtual object;
in response to the AR target being recognized, invoking the model data of the virtual scene to generate the virtual scene;
after invoking the model data and generating the virtual scene, extracting the first sub-model data and the second sub-model data from the model data of the virtual scene when disassembling the virtual scene to obtain the N virtual objects; and
independently displaying and controlling the N virtual objects after the object information that separately corresponds to the N virtual objects are generated.

* * * * *